US007769560B2

(12) United States Patent
Igasaki et al.

(10) Patent No.: US 7,769,560 B2
(45) Date of Patent: Aug. 3, 2010

(54) PROFILING CONTROLLING METHOD AND CONTROLLER FOR CONTACT TYPE PROBES, AND CONTACT TYPE MEASURING MACHINE

(75) Inventors: Shiro Igasaki, Kawasaki (JP); Masaoki Yamagata, Kawasaki (JP)

(73) Assignee: Mitutoyo Corporation, Kawasaki-shi (JP)

( * ) Notice: Subject to any disclaimer, the term of this patent is extended or adjusted under 35 U.S.C. 154(b) by 221 days.

(21) Appl. No.: 12/022,556

(22) Filed: Jan. 30, 2008

(65) Prior Publication Data

US 2008/0195353 A1 Aug. 14, 2008

(30) Foreign Application Priority Data

Feb. 14, 2007 (JP) ............................. 2007-032933

(51) Int. Cl.
*G01B 5/20* (2006.01)

(52) U.S. Cl. ........................................ 702/168; 33/551

(58) Field of Classification Search ................ 702/168; 73/105; 33/551

See application file for complete search history.

(56) References Cited

U.S. PATENT DOCUMENTS 6,675,637 B2 1/2004 Saito
2007/0056176 A1* 3/2007 Matsumiya et al. ........... 33/551

FOREIGN PATENT DOCUMENTS

DE 10247113 7/2003
EP 1669734 6/2006
EP 1857775 11/2007

OTHER PUBLICATIONS

J. H. Shim et al., "A New Probing System for the In-Circuit Test of a PCB", International Conference on Robotics and Automation, Apr. 1996, pp. 593-595.

* cited by examiner

*Primary Examiner*—Bryan Bui
(74) *Attorney, Agent, or Firm*—Rankin, Hill & Clark LLP

(57) ABSTRACT

In profiling control of a contact type probe in which a contact point is moved along a surface of an object to be measured, while being in contact with the object by a constant measurement force F, a contact determination level is provided for detecting a predetermined force smaller than a target measurement force is applied to the contact point, contact determination is performed at the time when force applied to the contact point reaches the contact determination level during approach, and the contact point is shifted from position control to force control for bringing the contact point into contact with the object by the target measurement force. Thereby contact trace is prevented from occurring on the object to be measured without reducing approach speed as much as possible and lowering measurement efficiency. In this case, a command value of the force control may be interpolated and gradually increased from the contact determination level to the target measurement force, and thus impact increase and over-shoot can be prevented from causing due to high-response.

10 Claims, 11 Drawing Sheets

(a) Linear type (b) Exponent type (c) S-shape type

PROFILING CONTROLLING METHOD AND CONTROLLER FOR CONTACT TYPE PROBES, AND CONTACT TYPE MEASURING MACHINE

CROSS-REFERENCE TO RELATED APPLICATION

The disclosure of Japanese Patent Application No. 2007-32933 filed on Feb. 14, 2007 including specifications, drawings and claims is incorporated herein by reference in its entirety.

BACKGROUND OF THE INVENTION

1. Field of the Invention

The present invention relates to a profiling controlling method and controller for contact type probes, and a contact type measuring machine. More particularly, it relates to a contact type probe profiling controlling method and controller capable of measuring a shape, roughness of a surface or the like of a soft object to be measured such as a plastic lens or aluminum product while leaving noncontact trace on the object, and a contact type measuring machine equipped with the contact type probe which is profiling-controlled by the controller.

2. Description of the Related Art

As a touch sensor for probes used in the case of measuring a fine surface shape of an object to be measured with a fine shape measuring machine or a surface roughness measuring machine, or measuring an inner shape of a hole with a small hole measuring machine, the applicant proposes an excitation type force sensor shown in FIG. 1, the sensor being disclosed in Japanese Published Unexamined Patent Application No. 2001-91206 (Patent document 1). In the force sensor 10, piezoelectric elements 20 is adhered to both surfaces of a metallic base 12 integrated with a stylus 14, the piezoelectric element being separated into an exciting electrode (referred to as an exciting piezoelectric element) 22 and a detecting electrode (referred to as a detecting piezoelectric element) 24. Additionally, a contact point 16 constituted by a diamond chip or ruby ball is fixed to a tip (lower end in FIG. 1) of the stylus 14.

An example of a relationship between input amplitude and output amplitude of the force sensor 10 is shown in FIG. 2. In the case where the contact point 16 is in noncontact with a work 8 which is an object to be measured, when a specified input amplitude Pi is applied to the exciting piezoelectric element 22, the stylus 14 vertically ultrasonically vibrates at an amplitude of, for example, several nm to several tens nm, and a signal of an output amplitude Po appears in the detecting piezoelectric element 24.

When the contact point 16 comes into contact with the work 8, as shown in FIG. 3, the magnitude of the output amplitude decreases from Po to Px. When an output amplitude ratio $k0=(Px/Po)\times 100=90\%$, 135 [μN] is obtained as measurement force F in an example of a relationship between the output amplitude ratio k0 and the measurement force F. When the force sensor 10 connected to an actuator (not shown) is controlled so that the output amplitude ratio k0 is constantly kept, measurement force (F) fixed profiling measurement (referred to as force fixed profiling measurement) can be realized that is capable of measuring a shape or roughness of the work 8.

In the case of measuring the work with use of a contact type probe, as shown in FIG. 5, approach (operation of shifting the probe, at low speed, for contact with the object to be measured, detecting the contact, and stabilizing the contact by a target measurement force) to the work 8, which is the object to be measured, is required. Since, in such a force sensor 10, there occurs no measurement force unless the sensor comes into contact with the object to be measured, approach drive before contact with the force sensor and the object to be measured is normally performed by position control, etc., using a scale detector, and the position control is switched to force control after the contact with the sensor and the work 8. Then, the work 8 or probe (force sensor 10) attachment side is driven, and the sensor scans a surface of the work in a force control state. During the scan, a scale value of the probe and a position of the work are read as a shape measurement position. Then, after the force fixed profiling measurement ends, the force control is switched to the position control, and the sensor retracts to a retraction position.

During the approach operation, the target measurement force (force judged at which contact is stabilized) is compared, for detecting the contact, with the measurement force detected by the force sensor 10, and the position control is switched to the force control at the time when the measurement force exceeds the target measurement force. In this case, a delay time, e.g. about 100 μs, is caused to contact determination due to delay of an electric circuit, delay of calculation time of a digital controller, or the like. Consequently, as shown in FIG. 6, the probe is pushed into the work more deeply (over-push) than a position (measurement position) where the sensor is pushed into the work by the target measurement force. Further, when an approach speed is increased for raising measurement efficiency, not only does the amount of over-push become large but an impact in the contact become large, and, a contact trace remains on the object to be measured, which may cause problem especially in the case where the object is a lens or metal mold.

In order to prevent a contact trace from occurring due to approach, as shown in FIG. 7, a method has been conventionally employed that reduces, by reducing the approach speed as much as possible, the push-in amount, as much as possible, caused by the delay time in the contact determination and simultaneously reduces the impact in the contact, and thus prevents the contact trace from occurring on the object to be measured.

However, in the method, the approach speed must be reduced as much as possible, and the measurement efficiency is conspicuously lowered.

SUMMARY OF THE INVENTION

The present invention was made in order to solve the above problem, and aims at preventing a contact trace from occurring on an object to be measured without reducing an approach speed as much as possible and lowering measurement efficiency.

In order to solve the above problem, in the present invention, in profiling control of a contact type probe in which a contact point is moved along the object to be measured, while being in contact with the object by a fixed measurement force, a contact determination level is provided for detecting a predetermined force lower than the target measurement force is applied to the contact point, contact determination is performed at the time when the force applied to the contact point reaches the contact determination level during the approach, and the contact point is shifted from position control to force control for bringing the contact point into contact with the object to be measured by the target measurement force.

The predetermined force can be considered to be a force at which contact can be predicted for the object to be measured and the contact point begins.

The approach speed can be selected so as to satisfy the following inequality:

(push-in amount at contact determination level
+push-in amount by delay time of contact determination)
≦push-in amount by measurement force.

A command value of the force control is interpolated and gradually increased from the contact determination level to the target measurement force, and thus an impact increase or over-shoot can be prevented from causing due to high response.

Additionally, an interpolation curve of the force control command value can be classified into a linear type, exponent type or S-curve type.

Additionally, an interpolation time of the force control command value can be made variable.

The present invention provides a profiling controller for contact type probes, in which the contact point is moved along the surface of the object to be measured, while being in contact with the object by a fixed measurement force, the controller including:

contact detecting means for detecting a predetermined contact determination level force lower than the target measurement force is applied to the contact point;

position controlling means for controlling a position of the contact point;

force controlling means for controlling measurement force applied to the contact point; and means for performing the contact determination at the time when the force applied to the contact point reaches the contact determination level during the approach, and shifting the contact point from the position control to the force control for bringing, by the target measurement force, the contact point into contact with the object to be measured.

Additionally, the present invention provides a contact type measuring machine equipped with the contact type probe profiling-controlled by the controller.

According to the present invention, the contact trace can be prevented from occurring on the object to be measured without reducing the approach speed as much as possible and lowering measurement efficiency.

These and other novel features and advantages of the present invention will become apparent from the following detailed description of preferred embodiments.

BRIEF DESCRIPTION OF THE DRAWINGS

The preferred embodiments will be described with reference to the drawings, wherein like elements have been denoted throughout the figures with like reference numerals, and wherein.

DETAILED DESCRIPTION OF THE PREFERRED EMBODIMENTS

Embodiments of the present invention will be described below in detail with reference to the drawings.

Figure 1:
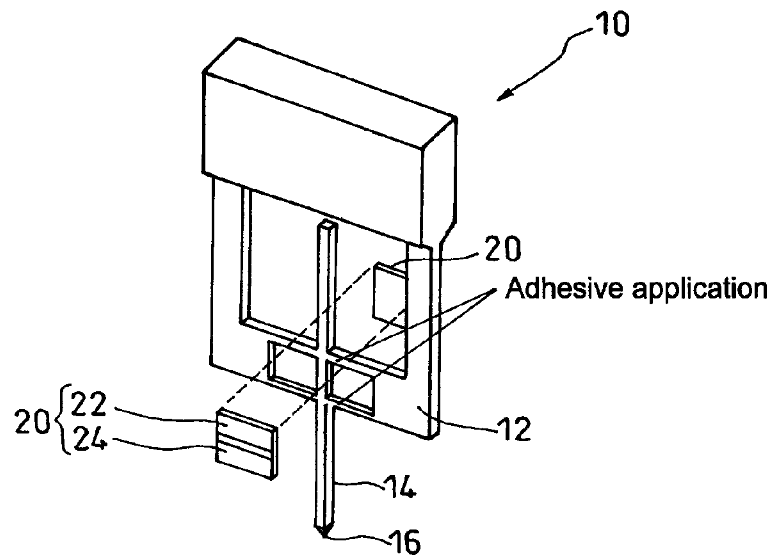
FIG. 1 is a perspective view of a force sensor disclosed in patent document 1.
Figure 2:
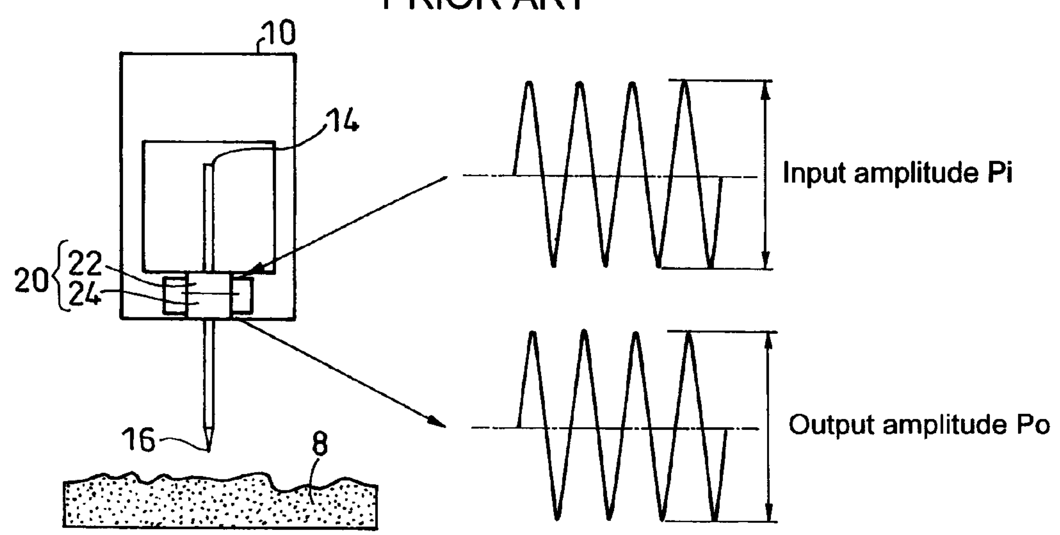
FIG. 2 is a graph indicating an example of a relationship between excitation amplitude and output amplitude, disclosed in patent document 1.
Figure 3:
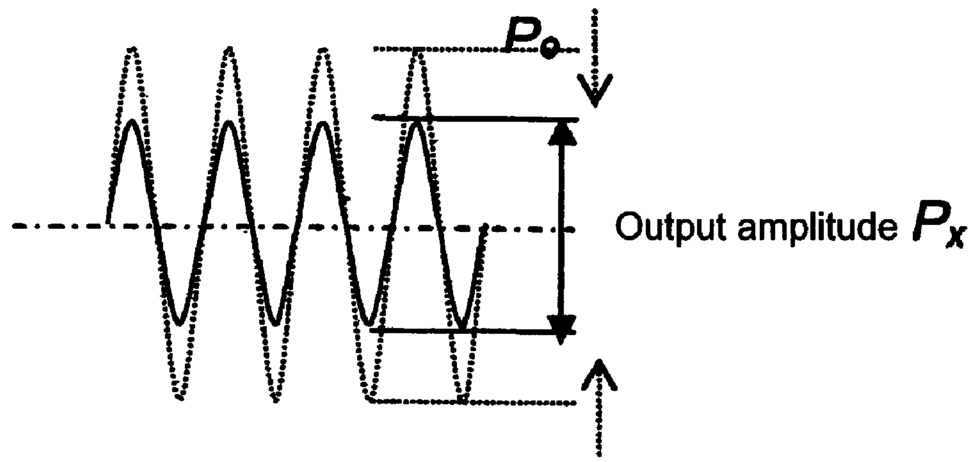
FIG. 3 is a graph indicating an example of change in the output amplitude at contact, disclosed in patent document 1.
Figure 4:
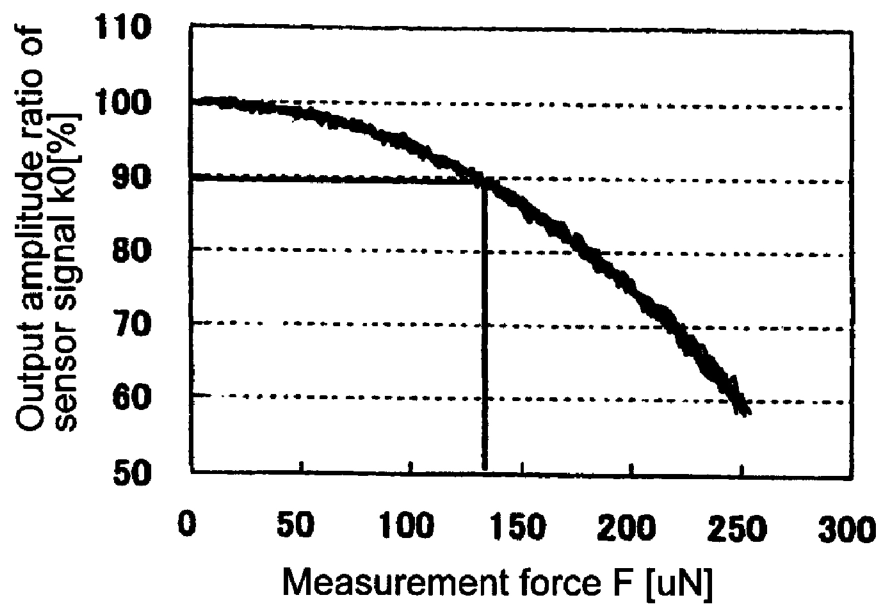
FIG. 4 is a graph indicating an example of a relationship between an output amplitude ratio and measurement force, disclosed in patent document 1.
Figure 5:
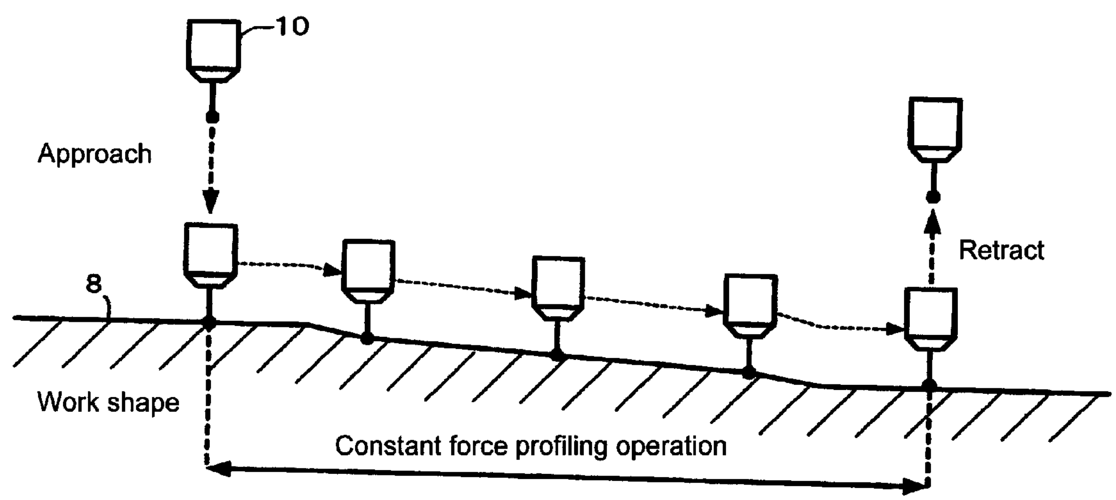
FIG. 5 is a view showing an example of force fixed profile measurement using the force sensor.
Figure 6:
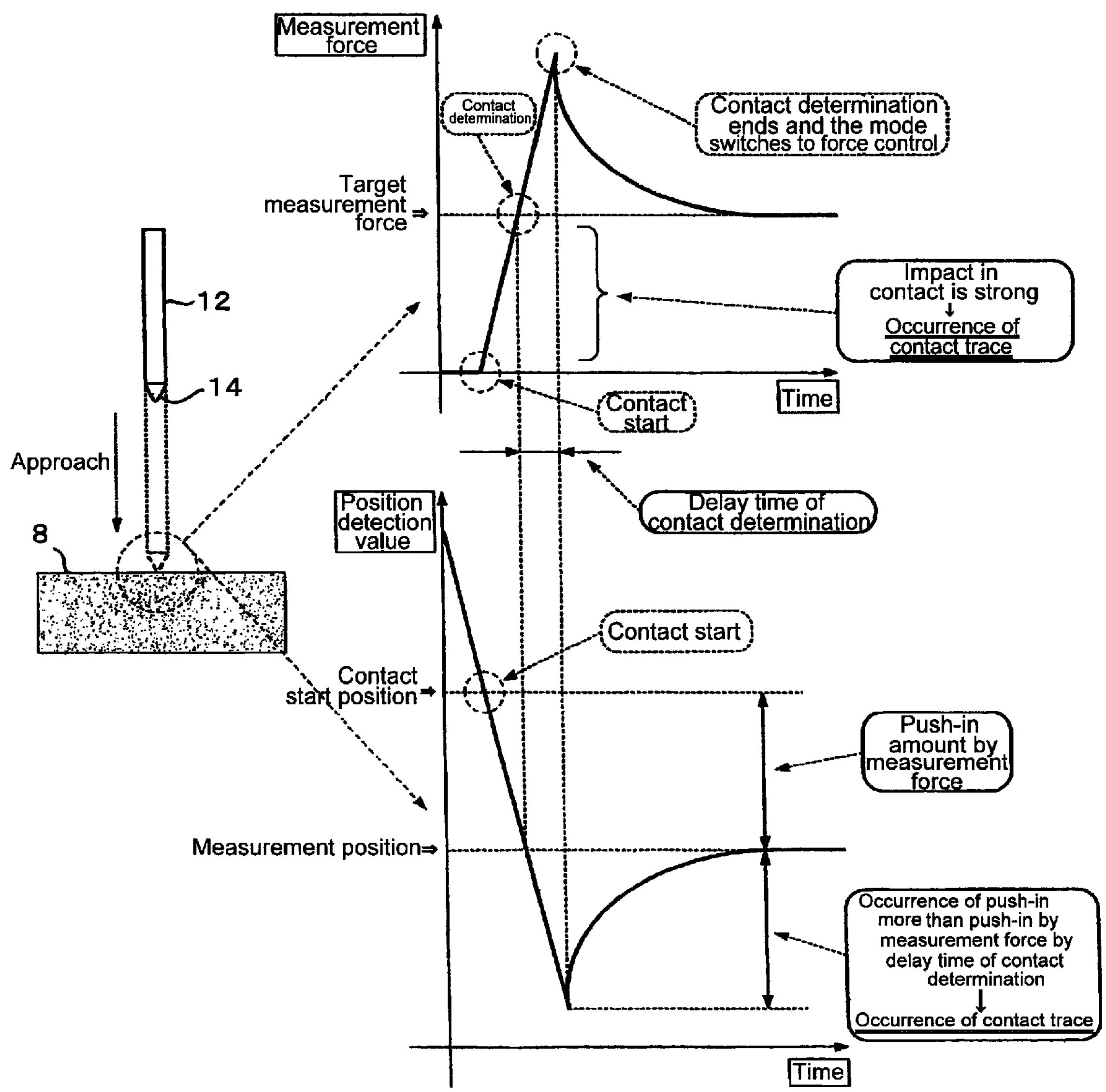
FIG. 6 is a view showing a state where a contact trace occurs, due to approach, on an object to be measured, disclosed in patent document 1.
Figure 7:
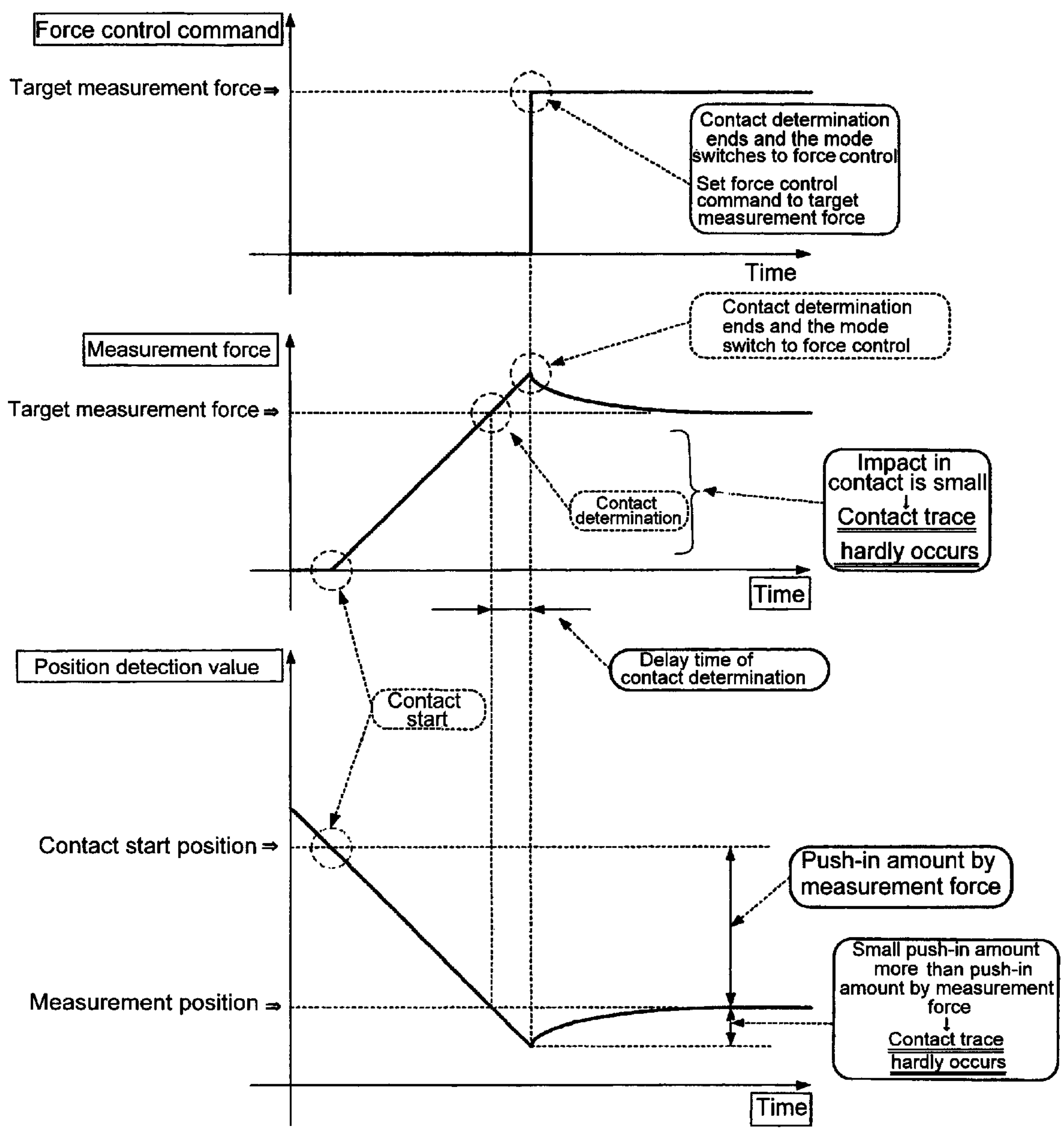
FIG. 7 is a graph indicating a state where an approach speed is low, disclosed in patent document 1.
Figure 8:
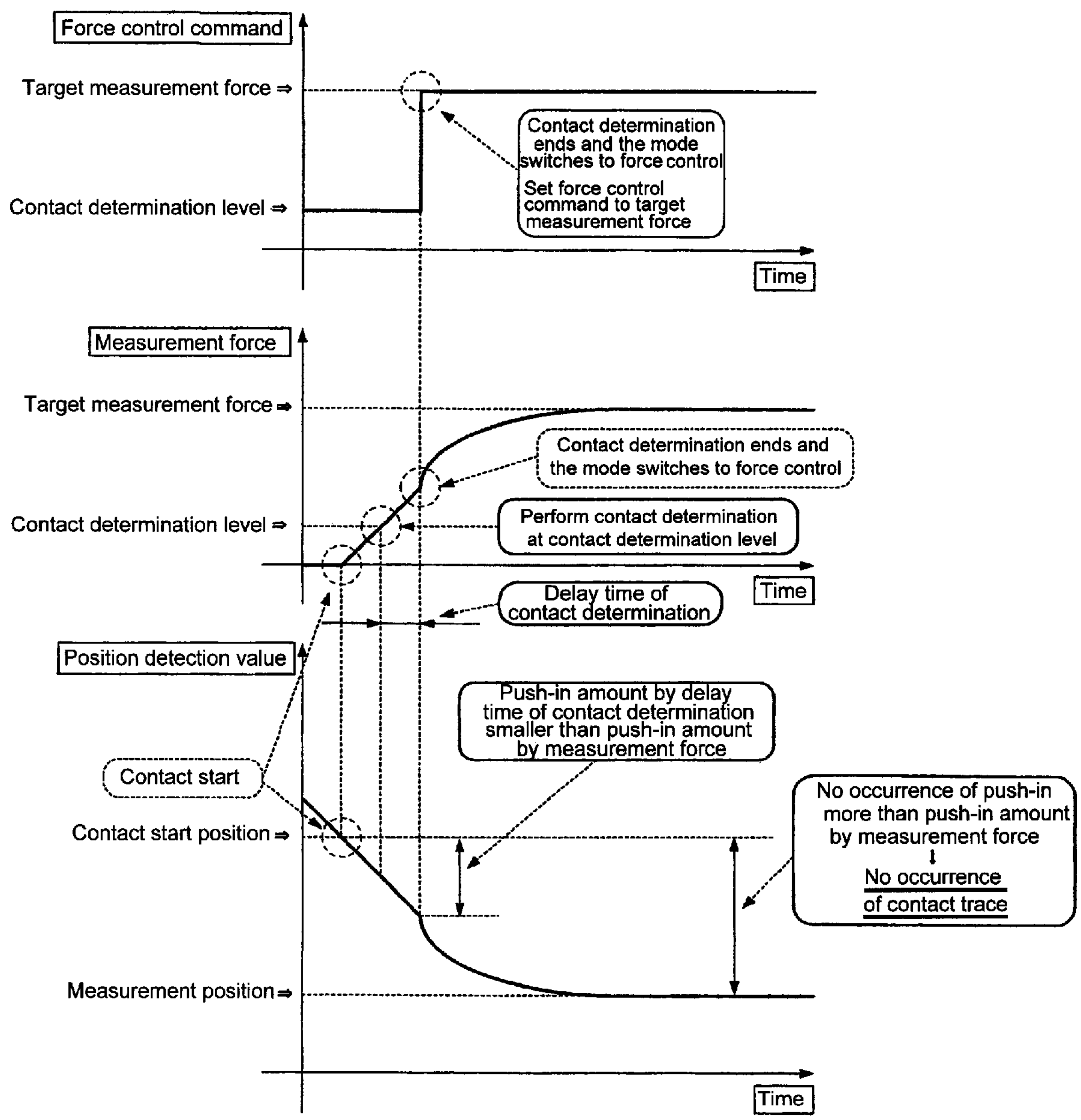
FIG. 8 is a graph indicating operation of a first embodiment of the present invention.

In a first embodiment of the present invention, as shown in FIG. 8, a contact determination level is provided for approach to an object to be measured, the level for detecting a predetermined force (force that it can be predicted contact begins) lower than the target measurement force (force that it is judged contact is stable for measurement) is applied to a contact point, the force being, contact determination is performed at the time when force applied to the contact point reaches the contact determination level during the approach, and the contact point is quickly shifted from position control to force control for bringing, by the target measurement force, the contact point into contact with the object to be measured.

Here, the contact determination level is set as a state where measurement force smaller than the target measurement force is generated. The push-in amount of a position of the probe at the contact determination level is smaller than that of a position of the probe pushed into the object by the target measurement force. When the force applied to the contact point reaches the contact determination level, the contact determination is performed, and position control is switched to force control.

In the method, the contact determination is performed at the time when the force exceeds the contact determination level, and the position control is switched to the force control. Therefore, if an approach speed is selected so as to satisfy the following inequality:

(push-in amount at contact determination level

+push-in amount by delay time of contact determination)

≦push-in amount by measurement force, over push-in does not occur, and noncontact trace remains on the object to be measured.

Figure 9:
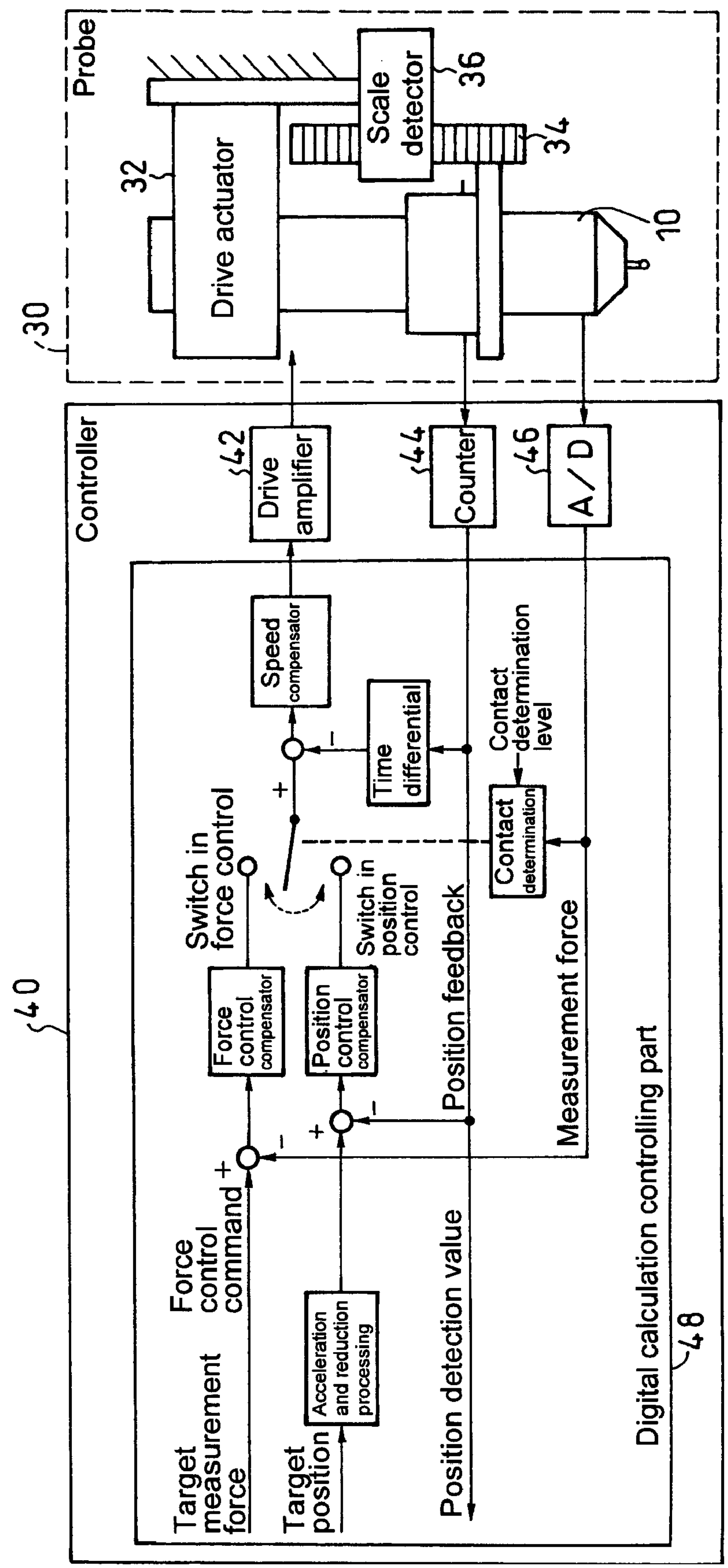
FIG. 9 is a block diagram illustrating a constitutional example of a probe system for carrying out the first embodiment.

FIG. 9 shows a constitutional example of a contact type profiling probe system employing a digital controller, to carry out the embodiment. In FIG. 9, a probe 30 includes: a force sensor 10 for detecting the measurement force, the sensor being similar to a conventional sensor; a drive actuator 32 for driving a tip of the probe in positioning control and force fixed profiling control; and a scale 34 and scale detector 36 for performing position feedback and counting a shape position detection value.

Additionally, a controller 40 includes: a drive amplifier 42 for supplying power to the drive actuator 32 of the probe 30 side; a counter 44 for counting a position of the probe based on output of the scale detector 36; an analog/digital (A/D) converter 46 for converting an analog signal from the force sensor 10 into a digital signal; and a digital control calculating part 48 capable of controlling the switching of the position control and force control.

Figure 10:
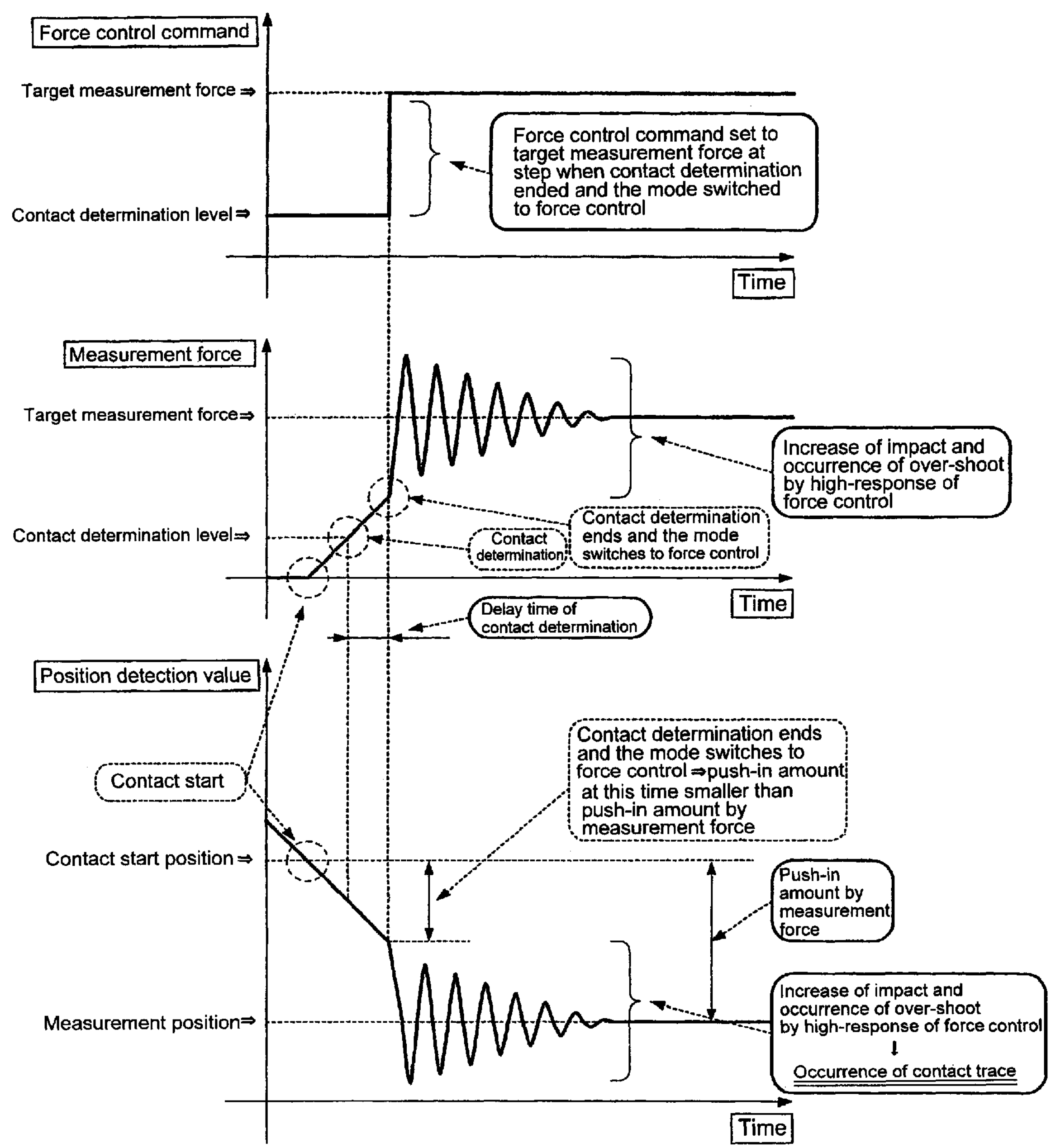
FIG. 10 is a graph indicating a problem of the first embodiment.

Moreover, in the case of the probe system for performing the force fixed profiling as shown in FIG. 9, in terms of improvement of measurement efficiency, the probe is desired to follow shape variation, as fast as possible, of the object to be measured. Accordingly, it is required to set a loop gain of a force control loop high and to make high-response. In this state, when the first embodiment is applied, as shown in FIG. 10, impact increase and over-shoot occur due to the high response, and there is a possibility that the contact trace remains on the object to be measured.

Figure 11:
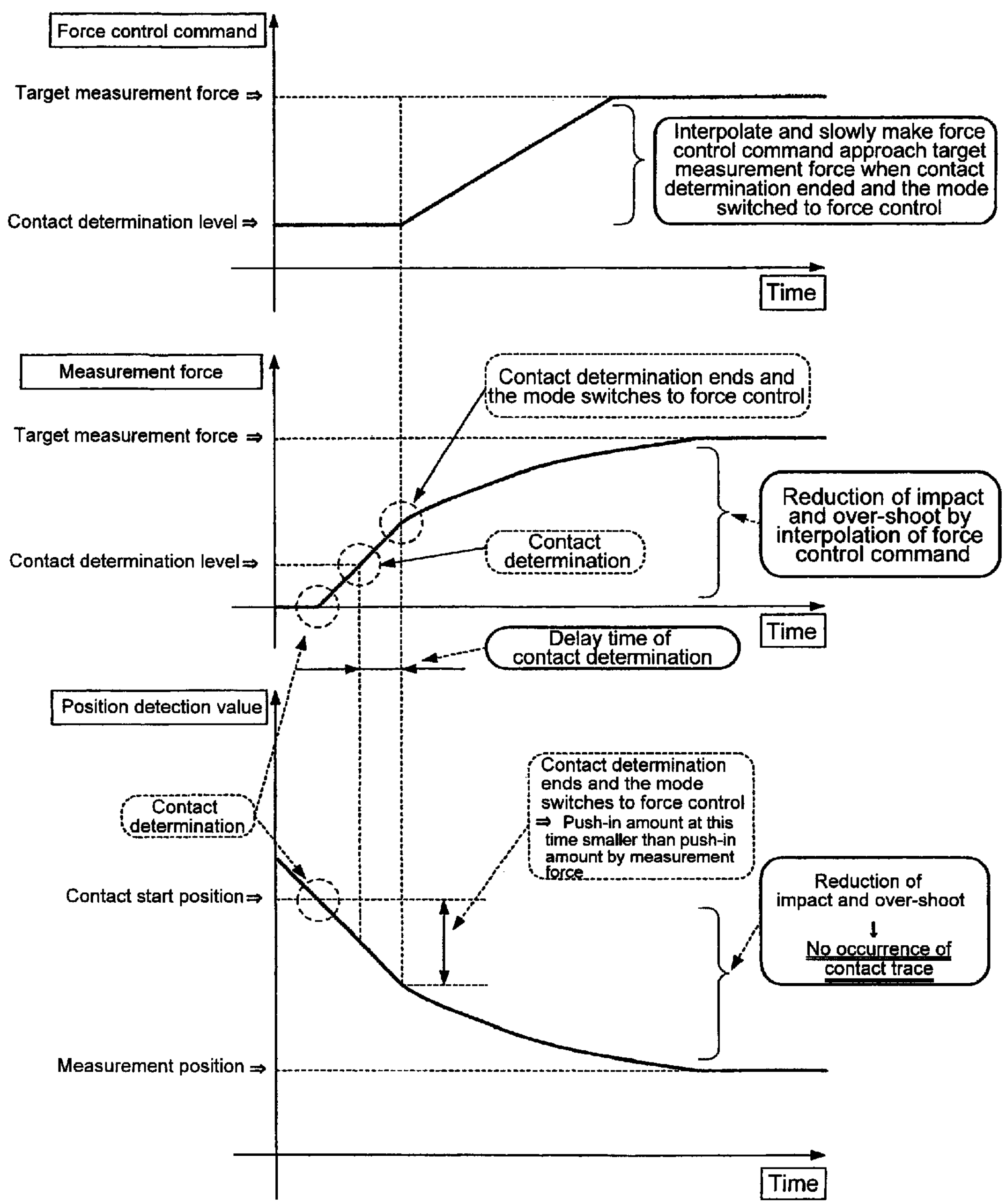
FIG. 11 is a graph indicating operation of a second embodiment of the present invention solving the problem of the first embodiment.

In order to solve such problems of the first embodiment, in a second embodiment of the present invention, as shown in FIG. 11, a force control command when the position control is switched to the force control is not raised at once to the target measurement force, but interpolated and gradually raised so as to approach the target measurement force. Thus, the impact and the over-shoot in contact are reduced, and the contact trace can be prevented from occurring.

Figure 12:
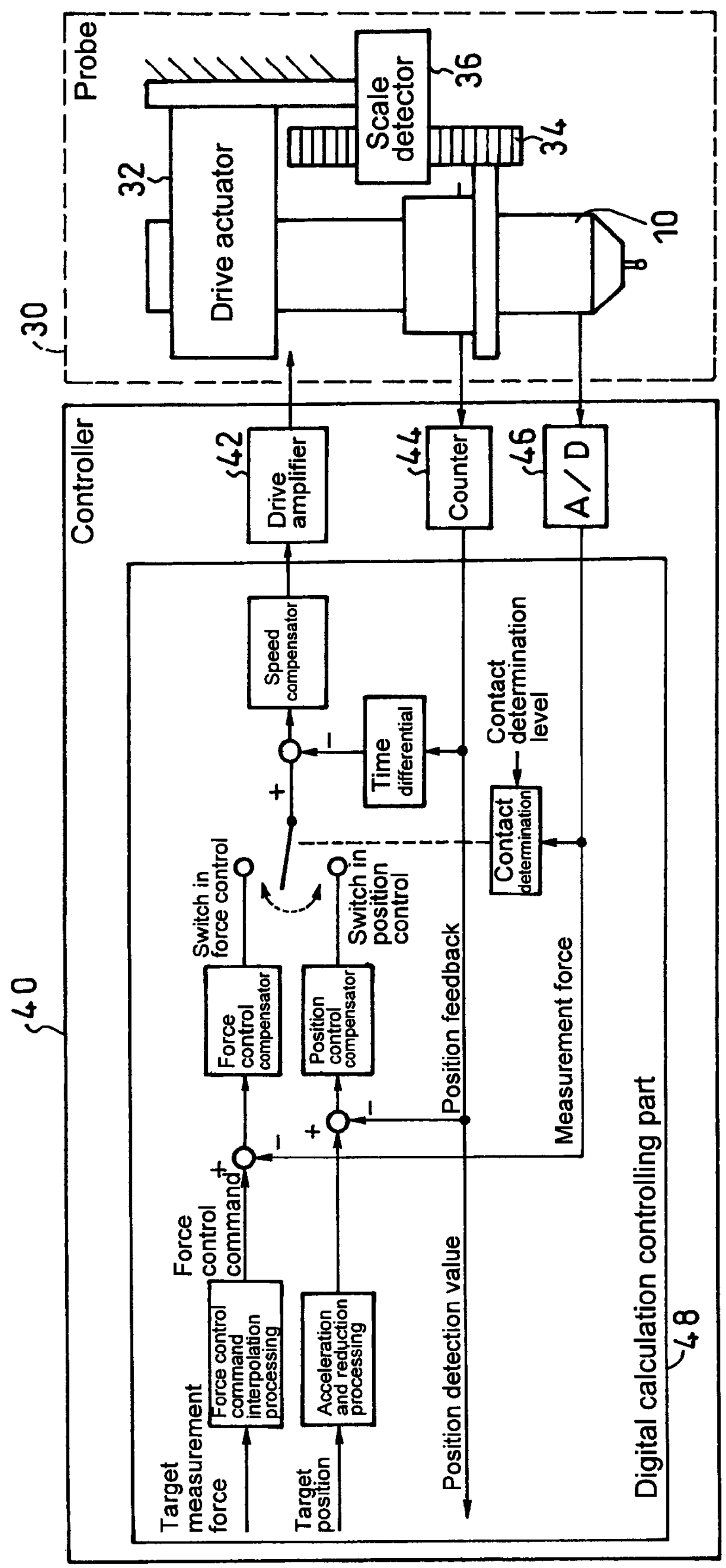
FIG. 12 is a block diagram illustrating a constitutional example of a probe system for carrying out the second embodiment.

FIG. 12 shows a constitutional example of a probe system of the embodiment.

The probe system is different from the probe system shown in FIG. 9 in the point that a force control command interpolation processing part for subjecting the target measurement force to interpolation processing and making it into the force control command is provided in the digital control calculating part 48. The system is similar to that shown in FIG. 9 in other points, therefore, description of the points is omitted.

Here, occurrence of the contact trace on the object to be measured depends on conditions such as properties, such as shape and hardness, of a contact part of the force sensor, approach speed, magnitude of impact in contact, properties such as hardness of a surface of the object to be measured, control performance of the position control and control performance of the force control. Thus, force control command interpolation processing may include the following performances.

Figure 13:
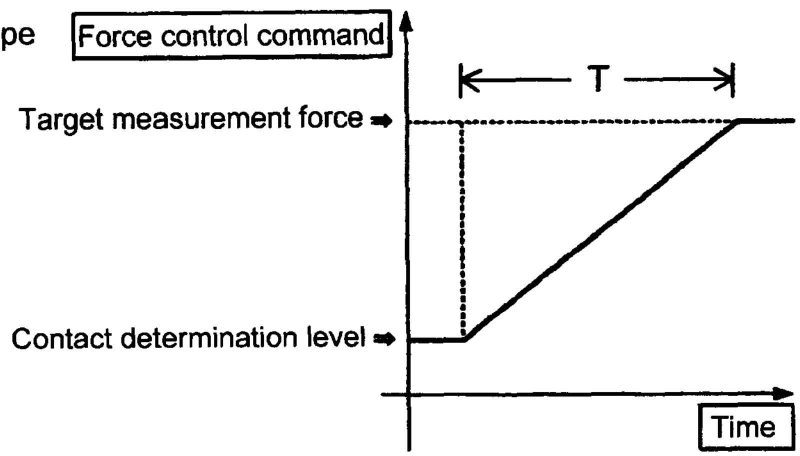
FIG. 13 is a graph indicating an example of an interpolation curve of a force control command of the second embodiment.
Figure 13:
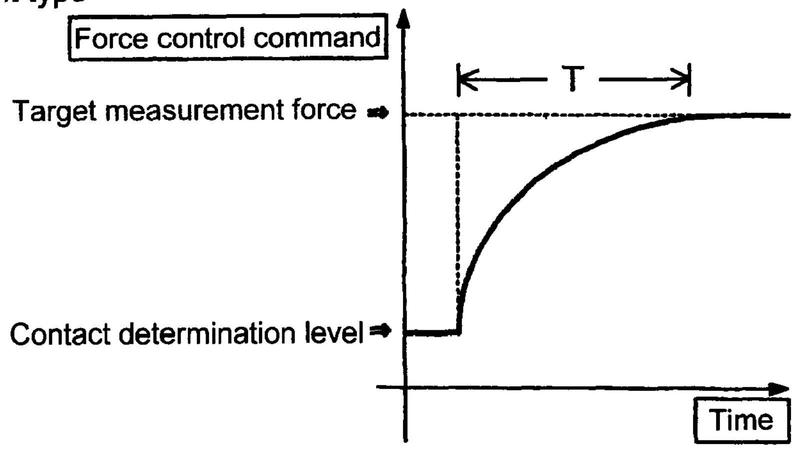
Figure 13:
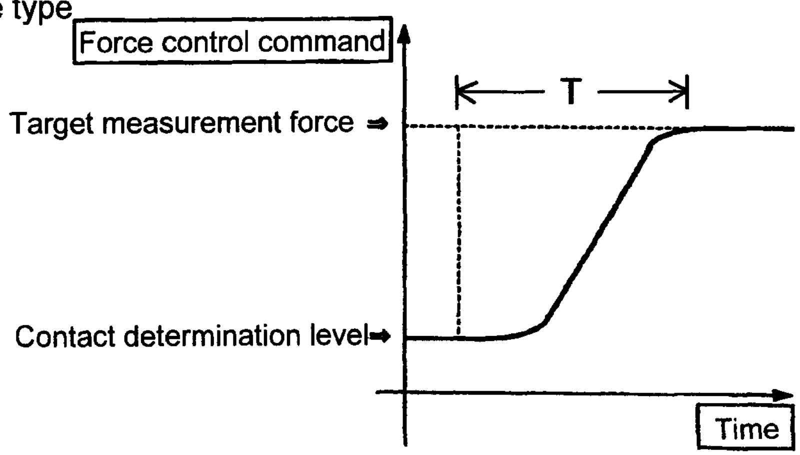

That is, as shown in FIG. 13, an interpolation curve of the force control command can be selected and used from arbitrary curves. In FIG. 11, the interpolation curve is shown by a straight line connecting the contact determination level and the target measurement force as shown in FIG. 13(*a*). However, interpolation curves of various types such as the exponent type shown in FIG. 13(*b*), S-curve type shown in FIG. 13(*c*) and the like can be used, the interpolation curve being used for an acceleration curve of the position control, and can be arbitrarily selected in accordance with a measurement condition or the like.

In the case of the linear type interpolation curve in FIG. 13(*a*), control is simple. On the other hand, in the case of the S-curve type interpolation curve in FIG. 13(*c*) being used, calculation is difficult, but extremely smooth control can be performed. Additionally, in the exponent type interpolation curve in FIG. 13(*b*), control can be performed more smoothly than that when the linear type interpolation curve in FIG. 13(*a*) is used, and calculation can be performed more easily than that when the S-curve type interpolation curve in FIG. 13(*c*) is used.

Additionally, an interpolation time T of shift from the contact determination level to the target measurement force can be arbitrarily selected, the time being shown in FIG. 13. For example, in the case of an object to be measured on which a contact trace easily occurs, the interpolation time is lengthened, and in the case of an object to be measured on which a contact trace hardly occurs, the interpolation time is shortened. Thus, the measurement efficiency can be raised.

Alternatively, in place of the interpolation time, increase (inclination) of force for unit time may be set like the acceleration command of the position control.

A user thus can select a proper interpolation processing in accordance with properties of the object to be measured, and can perform approach operation excellent in the measurement efficiency without causing a contact trace.

Moreover, though the applicant used, in the embodiments, the force sensor disclosed in patent document 1, a probe of the present invention is not limited thereto. The present invention can be similarly applied to any probe as long as it can observe fine measurement force. Additionally, the probe system is not limited to a digital constitution.

It should be apparent to those skilled in the art that the above-described exemplary embodiments are merely illustrative which represent the application of the principles of the present invention. Numerous and various other arrangements can be readily devised by those skilled in the art without departing from the spirit and the scope of the invention.

What is claimed is:

1. A profiling controlling method for contact type probes, in which a contact point is moved along a surface of an object to be measured, while being in contact with the object by a specified measurement force, comprising the steps of:

providing a contact determination level for detecting a predetermined force smaller than a target measurement force is applied to the contact point;

performing contact determination at the time when force applied to the contact point reaches the contact determination level during approach; and shifting the contact point from position control to force control for bringing the contact point into contact with the object by the target measurement force.

2. The profiling controlling method for contact type probes according to claim 1, wherein the predetermined force is a force at which contact can be considered to be predicted for the object to be measured and the contact point begins.

3. The profiling controlling method for contact type probes according to claim 1, wherein speed of the approach is selected so as to satisfy the following inequality: (push-in amount at contact determination level+push-in amount by delay time of contact determination)≦push-in amount by measurement force.

4. The profiling controlling method for contact type probes according to claim 1, wherein a command value of force control is interpolated and gradually increased from the contact determination level to the target measurement force.

5. The profiling controlling method for contact type probes according to claim 4, wherein an interpolation curve of the force control command value is linear.

6. The profiling controlling method for contact type probes according to claim 4, wherein the interpolation curve of the force control command value is an exponent type.

7. The profiling controlling method for contact type probes according to claim 4, wherein the interpolation curve of the force control command value is an S-curve type.

8. The profiling controlling method for contact type probes according to claim 4, wherein an interpolation time of the force control command value is variable.

9. A profiling controller for contact type probes, in which a contact point is moved along a surface of an object to be measured, while being in contact with the object by a specified measurement force, the controller comprising:

contact detecting means for detecting a predetermined contact determination level force lower than a target measurement force is applied to the contact point;

position controlling means for controlling a position of the contact point;

force controlling means for controlling measurement force applied to the contact point; and means for performing contact determination at the time when the force applied to the contact point reaches the contact determination level during approach, and shifting the contact point from position control to force control for bringing the contact point into contact with the object by the target measurement force.

10. A contact type measuring machine comprising a contact type probe profiling-controlled by the controller of claim 9.

* * * * *